United States Patent [19]
Ryan

[11] 3,745,790
[45] July 17, 1973

[54] SLIP CLUTCH
[75] Inventor: Kelly P. Ryan, Blair, Nebr.
[73] Assignee: Blair Manufacturing Co., Inc., Blair, Nebr.
[22] Filed: Mar. 8, 1971
[21] Appl. No.: 121,783

[52] U.S. Cl. .................................................. 64/29
[51] Int. Cl. .............................................. F16d 7/04
[58] Field of Search ........................................ 64/29

[56] References Cited
UNITED STATES PATENTS
| 2,773,370 | 12/1956 | Intraub et al. | 64/29 |
| 1,325,464 | 12/1919 | Decker | 64/29 |
| 2,441,038 | 5/1948 | Siesel | 64/29 |
| 2,688,857 | 9/1954 | Jones | 64/29 |
| 2,837,902 | 6/1958 | Stevens et al. | 64/29 |
| 3,347,062 | 10/1967 | Schumann et al. | 64/29 X |

FOREIGN PATENTS OR APPLICATIONS
| 749,550 | 5/1933 | France | 64/29 |

Primary Examiner—Allan D. Herrmann
Attorney—Hofgren, Wegner, Allen, Stellman & McCord

[57] ABSTRACT

1 A clutch, or slip coupling, having an improved spring release means to permit slippage between the driver and driven member under preselected conditions.

13 Claims, 4 Drawing Figures

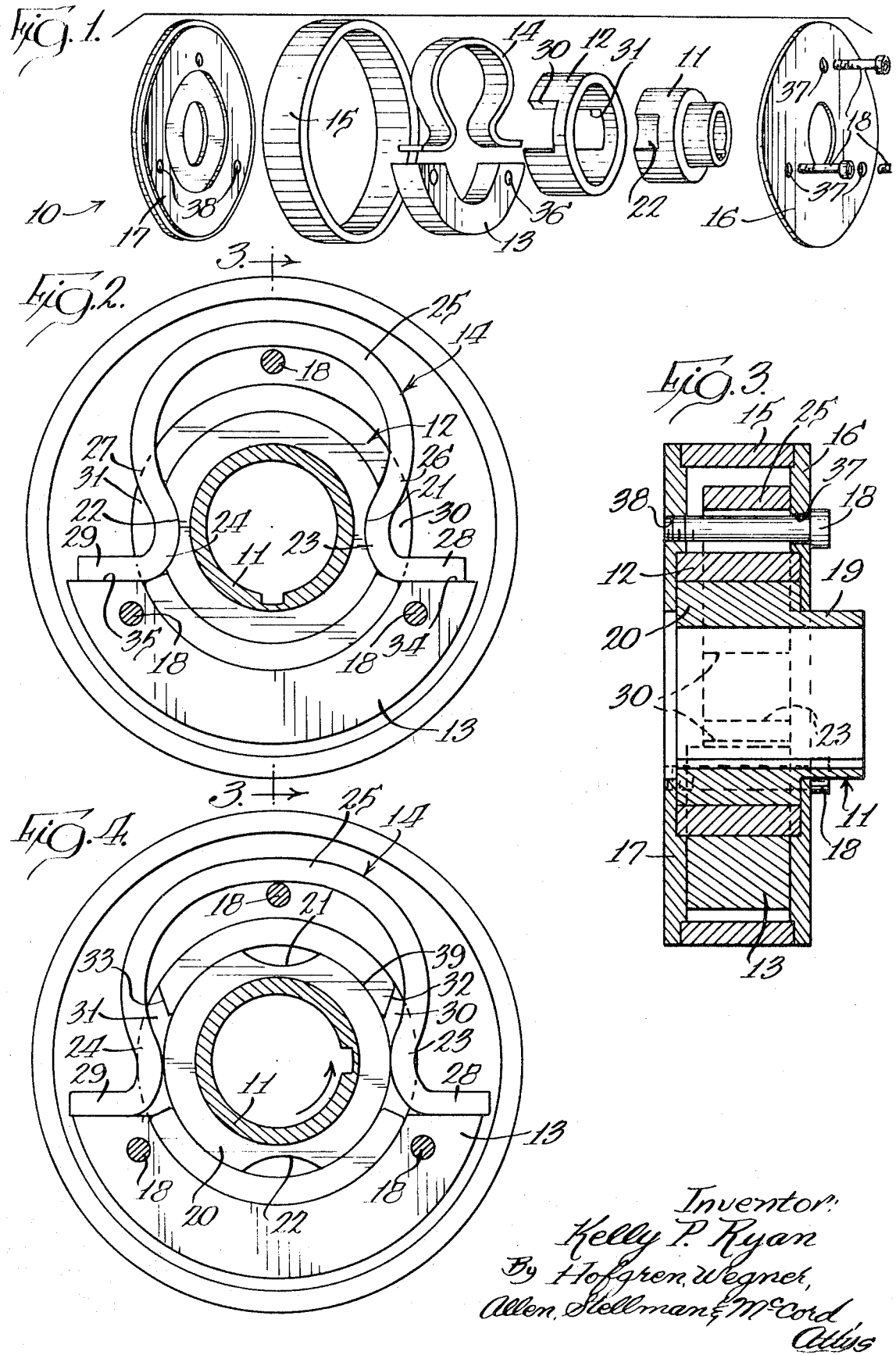

SLIP CLUTCH

BACKGROUND OF THE INVENTION

1. Field of the Invention

This invention relates to clutch mechanisms and in particular to slip clutch mechanisms.

2. Description of the Prior Art

In the conventional slip clutch mechanism, means are provided to permit relative movement between the driver and driven members of an apparatus. A serious disadvantage of such known slip clutches is relative complexity and high cost. Such known clutches have the further serious disadvantage of tendency to wear with resultant high maintenance requirements. One solution to these problems has been to provide a fluid clutch which has been found to raise other problems of inefficiency and maintenance, as well as complexity and high cost.

SUMMARY OF THE INVENTION

The present invention comprehends an improved slip clutch mechanism eliminating the disadvantages of the above discussed prior art slip clutches in a novel and simple manner.

More specifically, the invention comprehends the provision of a slip clutch including a cylindrical driver member having a pair of segmentally cylindrical diametrically opposite, radially outwardly opening recesses, an annular bearing journalling the driver member and having a pair of diametrically opposite openings, a driven member, a retainer member on the driven member, and a U-shaped spring member having a bight portion embracing the bearing and distal leg portions projecting through the openings into the recesses, and connector portions engaging the retainer member to retain the spring member for movement with the driven member, the connector portion being urged out of the recesses as an incident of movement of the driver member retainer relative to the driven member and being biased into the recess when the recesses are realigned with the connecting portions upon each 180° relative rotation between the driver and driven members.

The connector portions of the clutch may define outturned end portions of the spring member legs. The bearing may serve as a means for mounting the spring member and may include a flange for abutment by one side edge of the spring member.

The clutch may include a pair of end plates with the retainer member being disposed therebetween in fixed association therewith. The retainer member may be defined by an arcuate element extending concentrically of the bearing.

The bearing may be movably carried in the slip clutch.

The slip clutch is extremely simple and economical of construction while yet providing long trouble-free life thereby effectively minimizing maintenance requirements while yet providing a highly desirable improved slip coupling.

BRIEF DESCRIPTION OF THE DRAWING

Other features and advantages of the invention will be apparent from the following description taken in connection with the accompanying drawing wherein:

FIG. 1 is an exploded view of a slip clutch embodying the invention;

FIG. 2 is a transverse section thereof taken along the line of the rear of the front cover plate;

FIG. 3 is a diametric section taken substantially along the line 3—3 of FIG. 2; and FIG. 4 is a transverse section similar to that of FIG. 2 but in a slipped arrangement.

DESCRIPTION OF THE PREFERRED EMBODIMENT

In the exemplary embodiment of the invention as disclosed in the drawing, a slip clutch generally designated 10 is shown to comprise a driver member 11 rotatably journalled in an annular bearing 12. The driven member of the clutch includes a retainer 13 and a cooperating spring member 14 carried in an assembled cylindrical side wall 15, front end plate 16, and rear end plate 17. The assembly is maintained by suitable securing means, such as screws 18. The slip clutch structure 10 is extremely simple and economical of construction as best seen in the exploded view of FIG. 1.

Driver member 11 includes a keyed hub portion 19, and a radially enlarged cylindrical portion 20 defining a pair of diametrically opposed recesses 21 and 22 (see FIG. 2). The recesses may be segmentally cylindrical and relatively shallow to receive correspondingly shaped inturned portions 23 and 24 of spring member 14, as shown in FIG. 2. Spring member 14 comprises a U-shaped member having a bight portion 25 embracing bearing 12 and leg portions 26 and 27 defining the inturned portions 23 and 24 and outturned distal ends 28 and 29. In their normal condition, spring member portions 23 and 24 are spaced apart slightly less than the spacing between recesses 21 and 22 of driver member 11.

Bearing 12 comprises a tubular member having a pair of openings 30 and 31 overlying recesses 21 and 22 in the coupling arrangement of the clutch as shown in FIG. 2. The edges 32 of opening 30 and edge 33 of opening 31 are inclined to conform to the shape of the legs 26 and 27 of spring member 14 as shown in FIG. 2. Thus, in the coupling arrangement of the clutch, spring member portions 23 and 24 are biased through the openings 30 and 31 into the recesses 21 and 22 of the driver member 11 whereby the spring member is retained for movement with the driver member.

Rotational force is transmitted from spring member 14 to the driven member assembly 15, 16, 17 by the abutment of spring member ends 28 and 29 with retainer 13 as shown in FIG. 2. Retainer 13 comprises a segmentally annular member having opposite ends 34 and 35 defining stop shoulders against which spring member ends 28 and 29 abut. Thus, depending on the direction of rotation of driver member 11, one or the other spring member legs 26 or 27 drives the driven member assembly by its engagement with the corresponding retainer shoulder. Retainer 13 is secured to the driven member assembly my means of a pair of the screws 18 passing through suitable openings 36 in the retainer. As shown in FIG. 1, each of the front end plate 16 and rear end plate 17 are provided with suitable holes 37 and 38 respectively for accommodating the screws 18. Holes 38 may be suitably threaded as shown in FIG. 3 for connection of the threaded portions of the screws thereto.

As best seen in FIG. 2, the outer diameter of bearing 12 is substantially less than the inner diameter of wall member 15 to accommodate the spring member 14 and retainer 13 therebetween. Further, the inner diameter of wall member 15 is sufficient to permit suitable outward movement of spring member legs 26 and 27 in the slipped arrangement of the clutch as shown in FIG. 4.

All of the elements of the slip clutch may be formed of suitable metal. Illustratively, the bearing may be formed of suitable bronze bearing material and the other elements may be formed of suitable steel.

In use, slip clutch 10 provides an improved slip functioning by means of the selective release and force transfer from driver member 11 by means of spring member 14. Thus, as seen in FIG. 2, in the normal coupled arrangement of the clutch, spring member portions 23 and 24 are biased firmly into recesses 21 and 22 of driver member 11. Rotation of driver member 11, illustratively in the clockwise direction, causes spring member leg 28 to bear against shoulder 34 of retainer 13 thereby transmitting rotational force to the retainer 13 and driven member assembly 15, 16, 17. Suitable means (not shown) may be associated with the driven member assembly for transferring the output torque to the apparatus to be driven (not shown).

In the event rotation of the driven member assembly is retarded sufficiently to cause a force differential preselected to cause recesses 21 and 22 to cam the spring member portions 23 and 24 outwardly therefrom, driver member 11 may continue to rotate but with an impositive connection between the driver member and driven member assembly. Thus, as seen in FIG. 4, spring member portions 23 and 24 will ride on the outer surface 39 of driver member 11 until the driver member has rotated 180° whereupon the spring member portions 23 and 24 are biased back into the recesses 21 and 22 now in 180° opposite relationship from the original position of FIG. 2. Assuming that the torque differential is still sufficient to cause the spring member portions 23 and 24 to again be urged outwardly from the recesses 21 and 22, further rotation of the driver member relative to the driven member assembly is permitted with the spring member portions 23 and 24 again riding on the outer surface of drive member portion 20.

Continued slippage of the clutch may occur until such time as the torque differential is reduced to permit maintenance of spring member portions 23 and 24 again in driver member recesses 21 and 22. Thus, a direct connection between the driver member and the driven member assembly is reformed.

The wear portions of slip clutch 10 effectively comprise the recessed cylindrical portion 20 of driver member 11 and the inturned portions 23 and 24 of spring member 14. These elements are extremely simple and economical of construction and, thus, while providing long life, may be readily replaced when necessary at low cost.

Thus, it may be seen that slip clutch 10 permits slippage whenever the force differential passes a preselected amount for which the clutch is designed and immediately restores a direct dirve from the driver member 11 when the torque differential drops below the preselected amount. Only a small number of parts are required to provide this improved slipped coupling.

The foregoing disclosure of specific embodiments is illustrative of the broad inventive concepts comprehended by the invention.

I claim:

1. A slip clutch comprising: a driver member having a cylindrical portion provided with a radially outwardly opening recess; an annular bearing journalling said driver member and having a cylindrical portion provided with an opening therethrough overlying said recess; a driven member having a retainer portion; and a one-piece spring member adjacent said bearing and having a coupling portion extending inwardly through said bearing opening into said driver member recess, a holding portion for engaging said driven member retainer portion to hold said spring member for movement with said driven member, and a portion extending from said coupling portion and engaging said driver member at a position spaced from said recess and biasing said coupling portion into said recess, said coupling portion being arranged to be expelled from said recess in the event movement of said driven member directly with said driver member is prevented.

2. The slip clutch of claim 1 wherein said spring member comprises a turned member embracing said bearing means.

3. A slip clutch comprising: a driver member having a cylindrical portion with a radially outwardly opening recess; an annular bearing journalling said driver member and having a cylindrical portion provided with an opening therethrough overlying said recess; a driven member having a retainer portion; and a spring member adjacent said bearing and having a coupling portion biased inwardly through said bearing opening into said driver member recess and a holding portion for engaging said driven member retainer portion to hold said spring member for movement with said driven member, said coupling portion being arranged to be expelled from said recess in the event movement of said driven member directly with said driver member is prevented, said spring member comprising a U-shaped member having a bight portion embracing said bearing means and a distal leg portion defining said coupling portion.

4. The slip clutch of claim 1 wherein said driver member is further provided with a second recess diametrically opposite said first named recess, and said bearing is provided with a second opening diametrically opposite said first named opening, and said spring member is further provided with a second coupling portion biased inwardly through said second opening into said second recess.

5. The slip clutch of claim 4 wherein said driven member is further provided with a second retainer portion and said spring member is further provided with a second holding portion for engaging said second retainer portion to hold said spring member for movement with said driven member.

6. The slip clutch of claim 1 wherein said driven member retainer portion comprises a stop shoulder and said spring member holding portion comprises a stop portion abutting said stop shoulder.

7. A slip clutch comprising:
a cylindrical driver member having a pair of segmentally cylindrical diametrically opposite, radially outwardly opening recesses;
an annular bearing journalling said driver member and having a pair of diametrically opposite openings;
a driven member;
a retainer member on said driven member; and
a U-shaped spring member having a bight portion embracing the bearing and distal leg portions projecting through said openings into said recess and connector portions engaging said retainer member to retain said spring member for movement with said driven member, said connector portions being urged out of said recesses as an incident of movement of the driven member retainer member relative to the driver member and being biased into said recesses when the recesses are realigned with said connector portions upon each 180° relative rotation between said driver and driven members.

8. The slip clutch of claim 7 wherein said connector portions comprise outturned ends of said legs.

9. The slip clutch of claim 7 wherein said bearing defines inclined surfaces at the opposite edges thereof.

10. The slip clutch of claim 7 wherein said bearing further defines an end flange abutting one side edge of said spring member.

11. The slip clutch of claim 7 wherein said driven member includes a pair of annular end plates and said retainer member comprises a rigid member secured between said end plates.

12. The slip clutch of claim 7 wherein said retainer member comprises an arcuate member extending concentrically of said bearing.

13. The slip clutch of claim 7 wherein said bearing is movably carried by said driven member.

* * * * *